(12) United States Patent
Babej

(10) Patent No.: US 8,939,689 B2
(45) Date of Patent: *Jan. 27, 2015

(54) FUNCTIONAL ELEMENT IN THE FORM OF A PRESS-IN ELEMENT

(71) Applicant: PROFIL Verbindungstechnik GmbH & Co. KG, Friedrichsdorf (DE)

(72) Inventor: Jiri Babej, Lich (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,170

(22) Filed: Mar. 22, 2013

(65) Prior Publication Data
US 2014/0003882 A1    Jan. 2, 2014

(30) Foreign Application Priority Data

Mar. 27, 2012  (DE) .......................... 10 2012 006 221
Mar. 20, 2013  (EP) ..................................... 13160114

(51) Int. Cl.
*F16B 37/04*    (2006.01)
*F16B 19/00*    (2006.01)
(Continued)

(52) U.S. Cl.
CPC . *F16B 19/00* (2013.01); *B21K 1/46* (2013.01); *F16B 37/068* (2013.01)
USPC .......................................... 411/180; 411/181

(58) Field of Classification Search
CPC .... F16B 37/048; F16B 37/062; F16B 37/065; F16B 37/067; F16B 37/068; F16B 37/125; B21K 1/702; B23P 19/064
USPC .................... 411/179, 180, 181, 183
See application file for complete search history.

(56) References Cited

U.S. PATENT DOCUMENTS 2,544,304 A    3/1951  Eckenbeck et al.
3,399,409 A    9/1968  Breed
(Continued)

FOREIGN PATENT DOCUMENTS

DE    37 04 763 C1    10/1988
DE    44 10 475 A1    9/1995
(Continued)

OTHER PUBLICATIONS

German Search Report dated Jan. 3, 2012 & English translation.
(Continued)

*Primary Examiner* — Roberta DeLisle
(74) *Attorney, Agent, or Firm* — Hershkovitz & Associates, PLLC; Abraham Hershkovitz; Eugene Rzucidlo

(57) ABSTRACT

A functional element in the form of a press-in element for attachment to a sheet metal part is disclosed which has a head part and a shaft part, the head part has a ring-like sheet metal contact surface within which is a ring-like axial recess which surrounds the shaft part at the transition of the head part into the shaft part. The shaft part has a plurality of peripherally distributed radial recesses extending in the axial direction between which are axially extending and radially projecting noses having raised material portions which form undercuts with the head part in the region of the ring-like recess, the undercuts being present at the positions of the radial recesses at their axial ends adjacent to the head part. Radially extending ribs providing security against rotation, or other anti-rotation security features, are provided in the base region of the ring-like recess.

19 Claims, 16 Drawing Sheets

(51) Int. Cl.
    *B21K 1/46*    (2006.01)
    *F16B 37/06*   (2006.01)

(56)  References Cited

U.S. PATENT DOCUMENTS

| | | | |
|---|---|---|---|
| 3,399,705 | A | 9/1968 | Breed et al. |
| 4,543,023 | A | 9/1985 | Capuano |
| 4,966,512 | A | 10/1990 | Takaku |
| 5,513,933 | A | 5/1996 | Rom |
| 5,797,175 | A * | 8/1998 | Schneider ............ 29/520 |
| 6,125,524 | A | 10/2000 | Mueller |
| 6,190,102 | B1 | 2/2001 | Vignotto et al. |
| 6,220,804 | B1 * | 4/2001 | Pamer et al. ............ 411/180 |
| 6,409,444 | B2 | 6/2002 | Pamer et al. |
| 6,592,311 | B2 * | 7/2003 | Wojciechowski et al. .... 411/107 |
| 6,712,370 | B2 | 3/2004 | Kawada et al. |
| 6,851,904 | B2 | 2/2005 | Parker |
| 7,014,406 | B2 * | 3/2006 | Robertson ............ 411/161 |
| 7,597,515 | B2 | 10/2009 | Ward |
| 7,815,406 | B2 * | 10/2010 | Babej et al. ............ 411/181 |
| 8,096,743 | B2 | 1/2012 | Babej |
| 8,371,785 | B2 | 2/2013 | Babej et al. |
| 8,734,071 | B2 * | 5/2014 | Babej ............ 411/180 |
| 2003/0108400 | A1 * | 6/2003 | Ross ............ 411/180 |
| 2004/0141826 | A1 * | 7/2004 | Babej et al. ............ 411/181 |
| 2005/0158142 | A1 * | 7/2005 | Babej et al. ............ 411/181 |
| 2006/0291974 | A1 * | 12/2006 | McGee et al. ............ 411/171 |
| 2008/0199274 | A1 | 8/2008 | Babej |
| 2011/0097173 | A1 | 4/2011 | Babej |

FOREIGN PATENT DOCUMENTS

| | | |
|---|---|---|
| DE | 195 35 537 A1 | 3/1997 |
| DE | 200 12 097 U1 | 2/2001 |
| DE | 103 53 642 A1 | 7/2005 |
| DE | 10 2006 062 073 A1 | 7/2007 |
| DE | 10 2007 034 987 A1 | 1/2009 |
| EP | 678 679 B1 | 10/1995 |
| EP | 759 510 B1 | 2/1997 |
| EP | 1 116 891 B1 | 7/2001 |
| EP | 2 019 214 A2 | 1/2009 |
| EP | 2 141 370 A1 | 7/2010 |
| JP | H10-213108 A | 8/1998 |
| WO | WO 2005/050034 A1 | 6/2005 |
| WO | WO 2005/099930 A1 | 10/2005 |
| WO | WO 2011/137065 A1 | 3/2011 |

OTHER PUBLICATIONS

European Search Report dated Apr. 24, 2012 & English translation.
English language abstract for DE102006062073.
English language abstract for EP2141370A1.
English language abstract for WO 2005/050034 A1.
English language abstract for DE 37 04 763 C1.
English language abstract for EP 1 116 891 B1.
English language abstract for EP 678 679 B1.
English language abstract for EP 759 510 B1.
German Search Report issued Feb. 12, 2013 in corresponding German Application No. 10 2013 204 958.7 (with an English Translation).
English Abstract for WO 2005/099930 A1.
English Abstract for JP H10-213108 A.

* cited by examiner

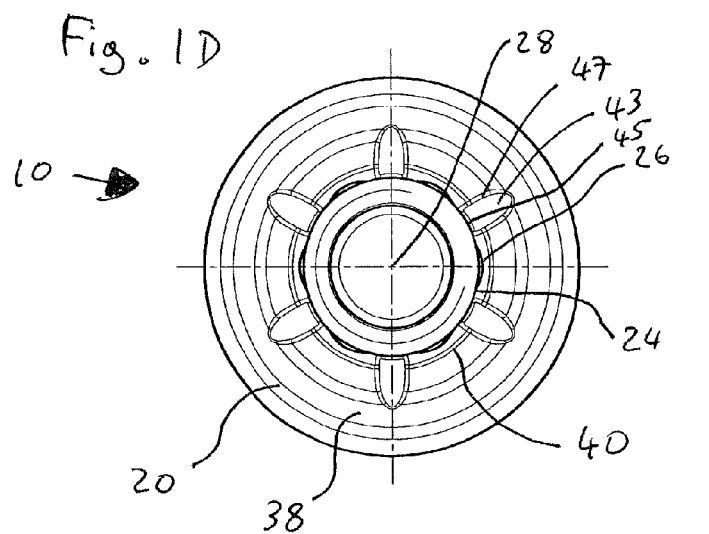
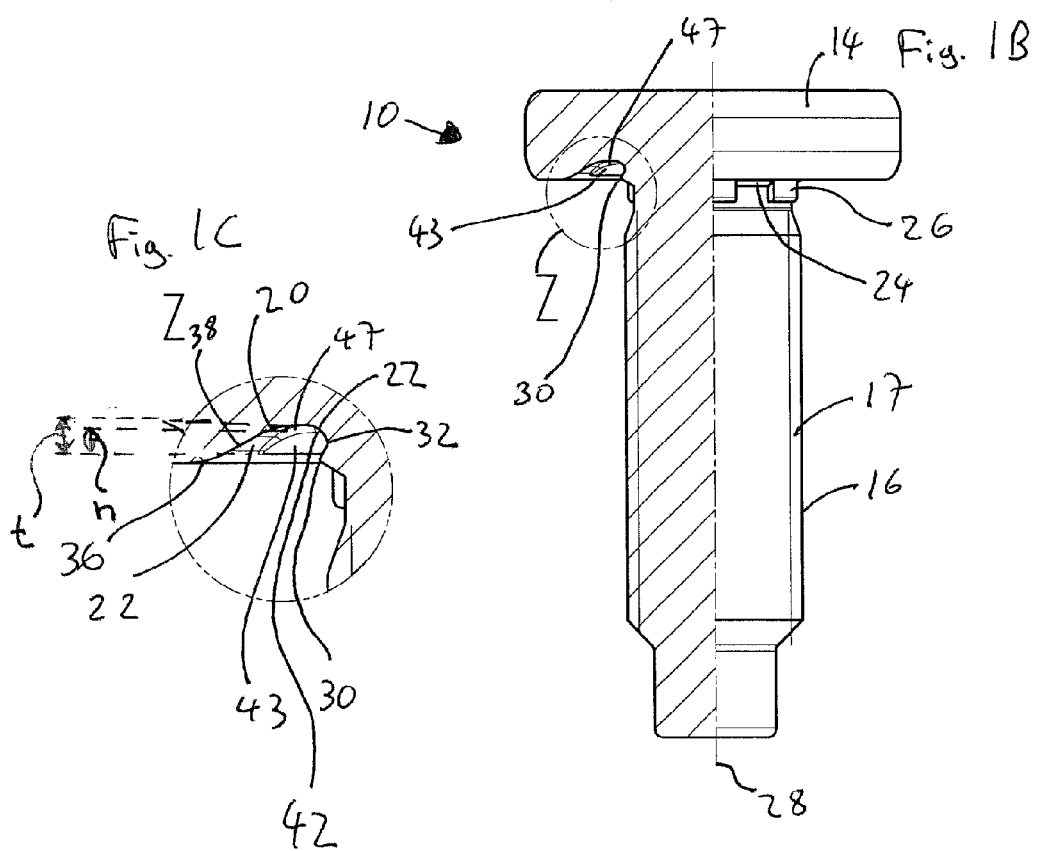

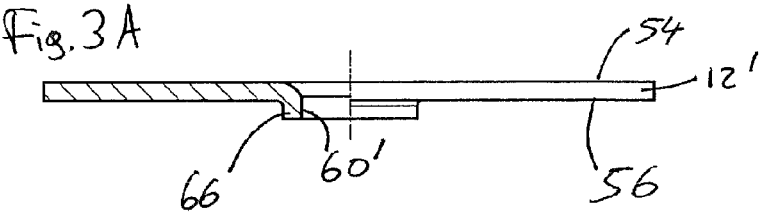
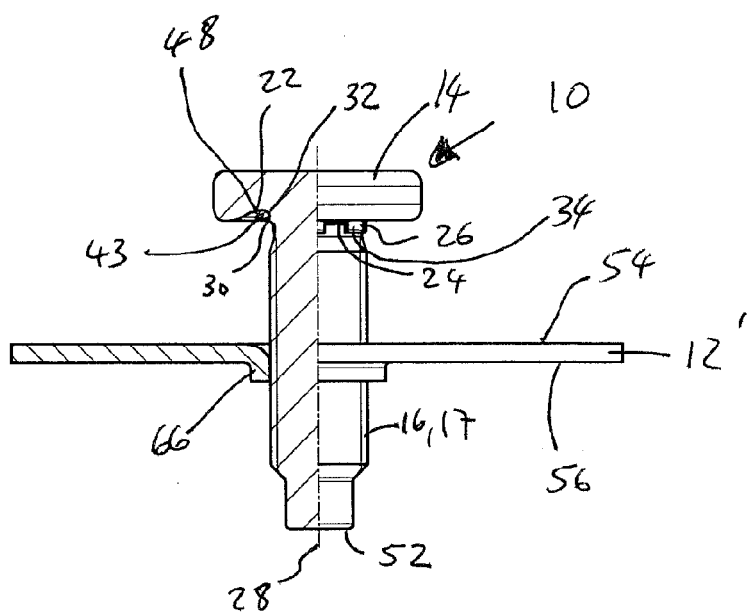
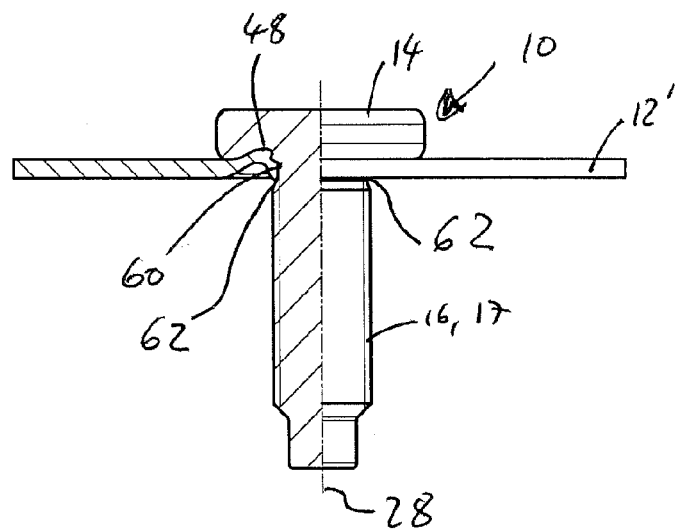

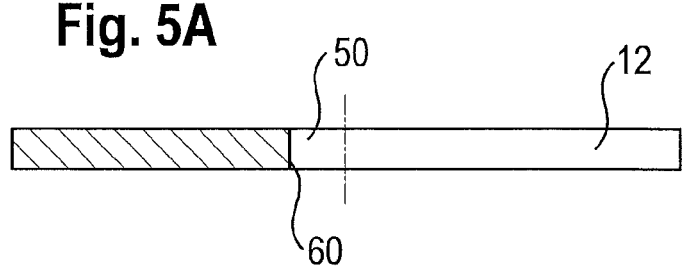
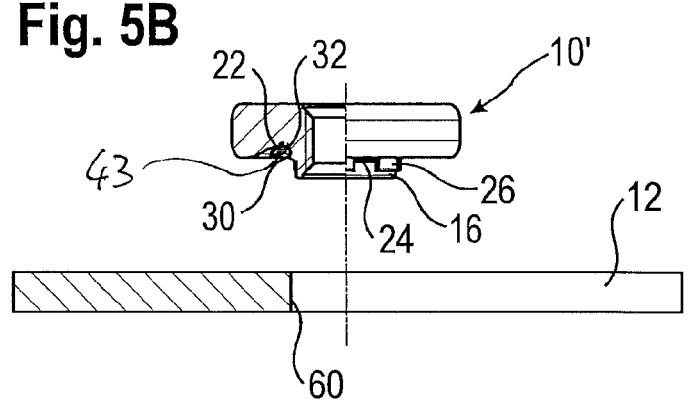
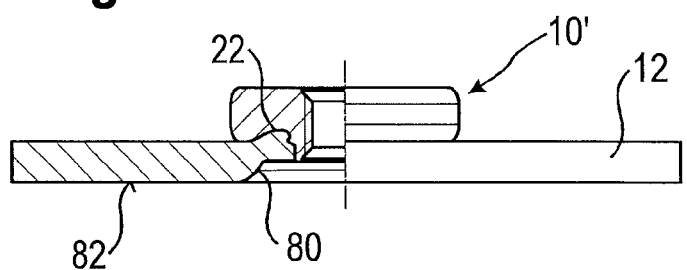

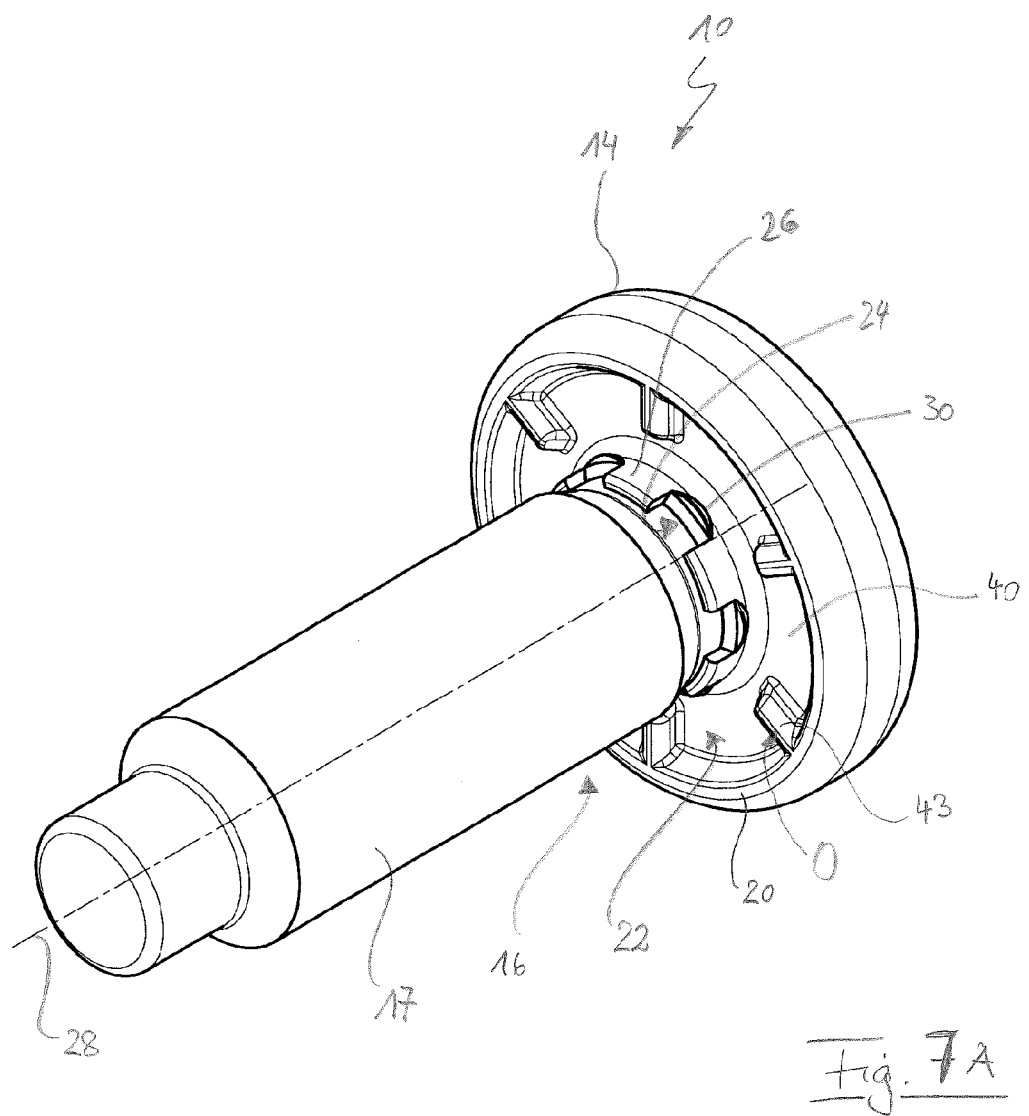

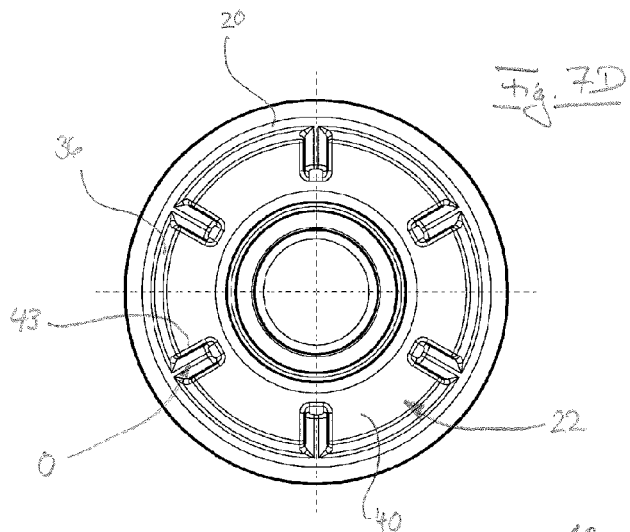
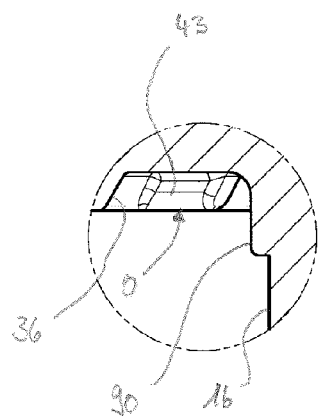
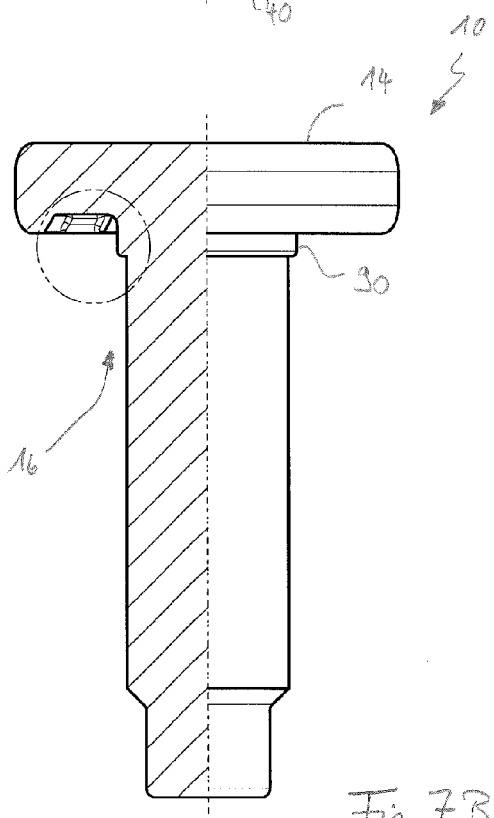

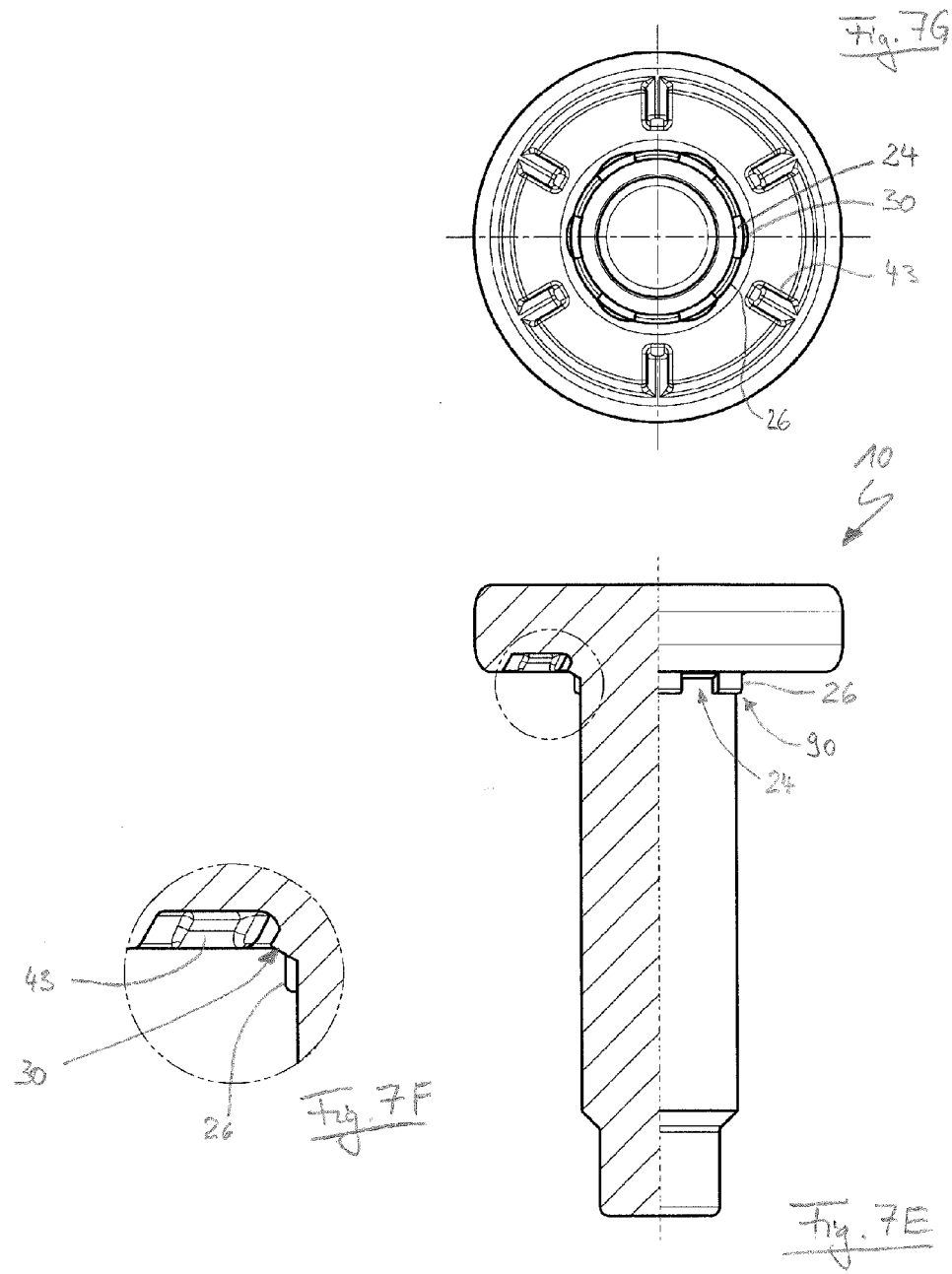

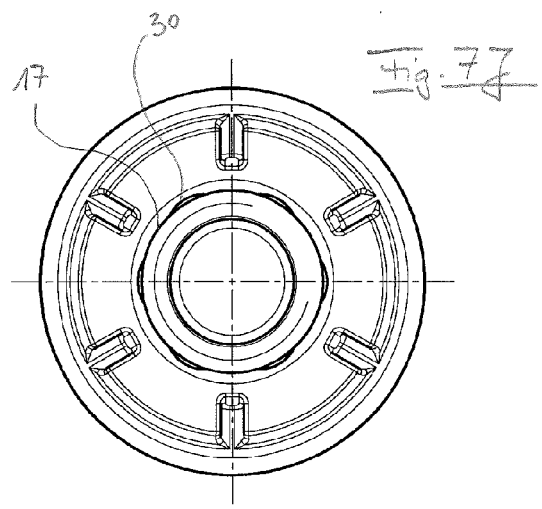
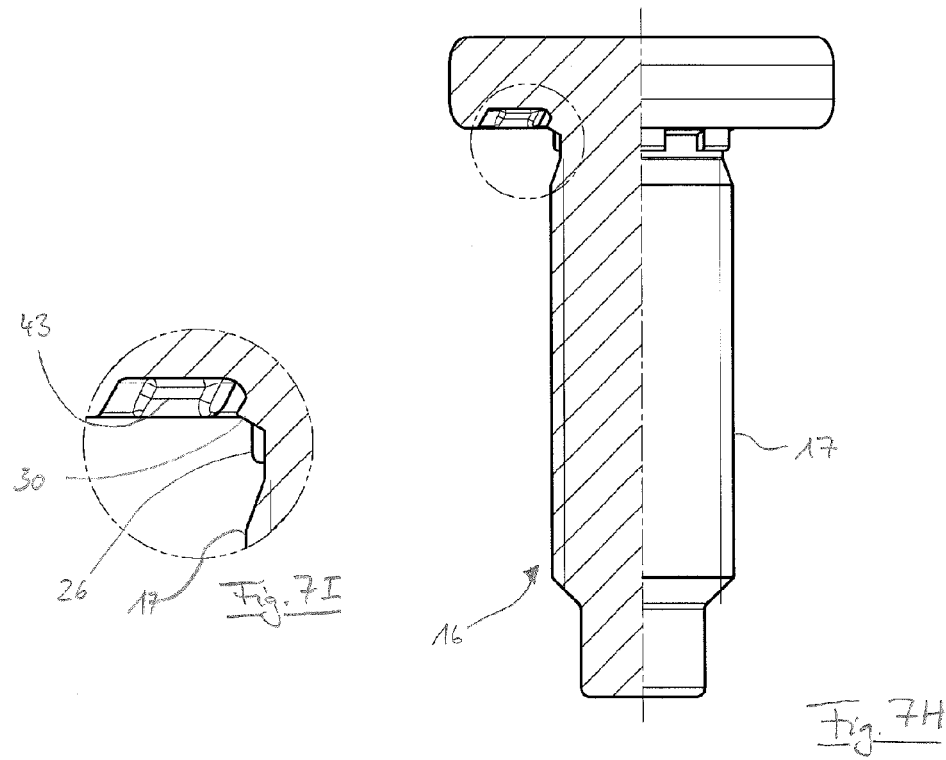

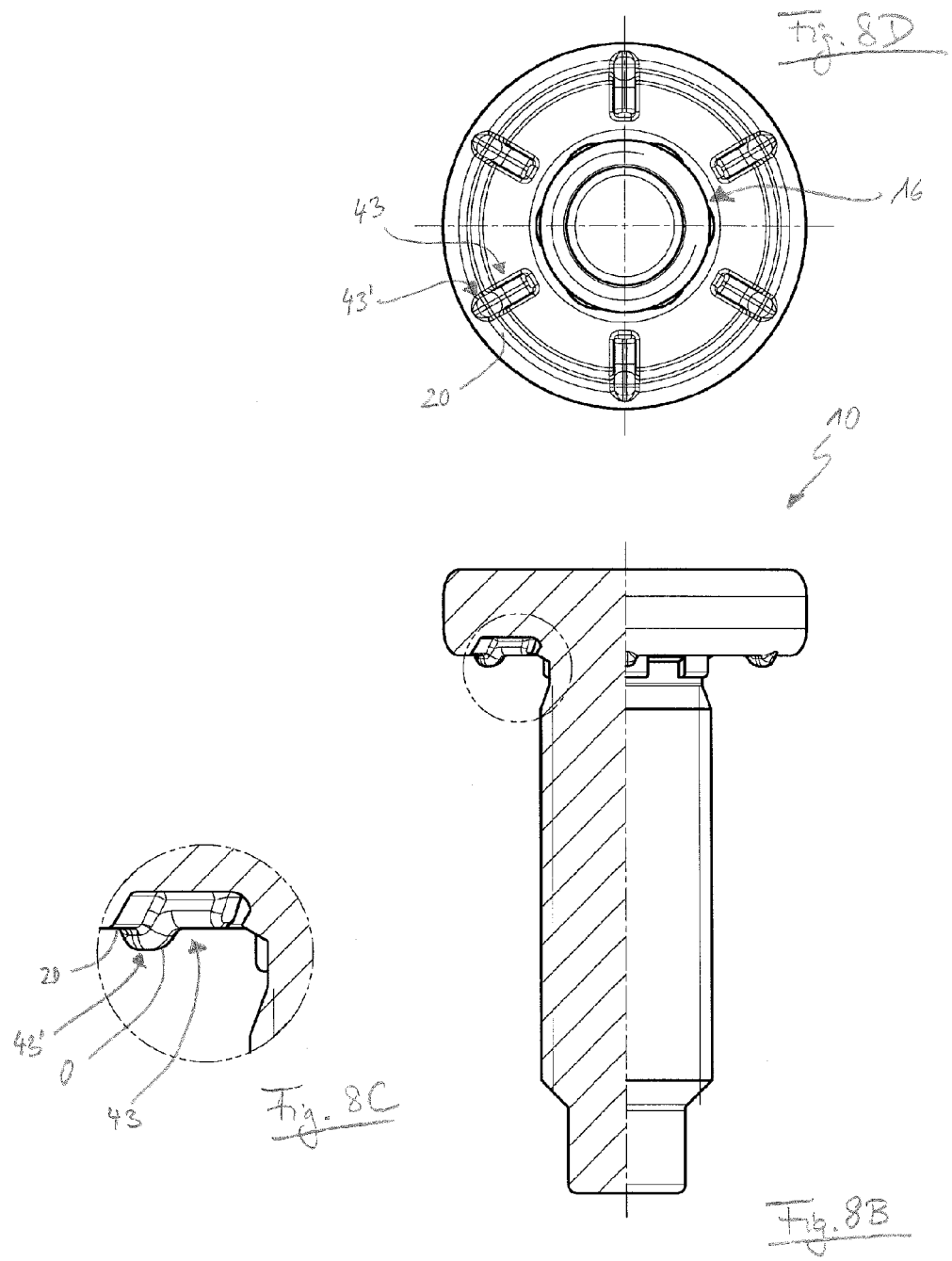

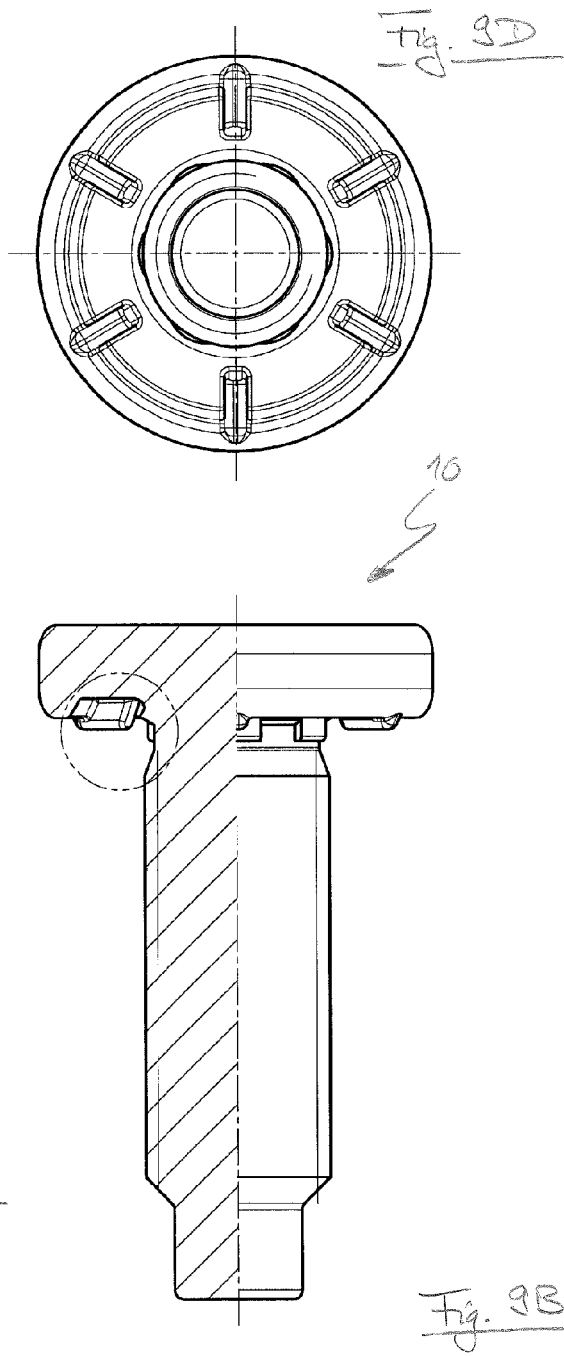

FUNCTIONAL ELEMENT IN THE FORM OF A PRESS-IN ELEMENT

FIELD OF THE INVENTION

The present invention relates to a functional element in the form of a press-in element for attachment to a sheet metal part. The functional element can either be formed as a male element or as a female element. As a male element a bolt element can be considered whose shaft part is provided with a thread, or an element whose shaft part is provided with a mount for a clip or the like, or an element whose shaft part is made cylindrical and serves as a journal for a component rotatable on an element.

BACKGROUND OF THE INVENTION

For a female element a nut element can principally be considered, i.e. an element having an internal thread, with the shaft part being able to be formed as a piercing section so that a self-piercing nut element is present. The thread does not have to be pre-manufactured but rather could be produced after the attachment of the nut element to a sheet metal part by means of a thread forming or thread cutting screw. The female element can however also be a hollow element with a cylindrical hollow space which serves for the rotatable journaling of a shaft.

Functional elements are known in the prior art in most diverse embodiments. On the one hand there are so-called rivet elements which have a rivet section, which is deformed on attachment to a sheet metal part, in order to form a rivet bead which together with the head part forms a ring-like recess for receiving the edge of a hole in a sheet metal part. With that rivet element the functional element is thus deformed on attachment to the sheet metal part. Typical examples for such rivet elements are the NBR bolt elements of the present applicants and the RND nut elements of the present applicants (European patent 1116891). Furthermore, so-called press-in elements are well known in which the element itself is not intentionally deformed on attachment to a sheet metal part but rather the sheet material itself is deformed, in order to bring this into engagement with undercuts of the respective press-in element. Various bolt elements and nut elements are also known here.

The so-called EBF bolts of the present applicants (European patent 678679) can be named as bolt elements and the so-called RSU elements (European patent 759510) of the present applicants can be named as nut elements.

SUMMARY OF THE INVENTION

The object of the present invention is to make available a functional element in the form of a press-in element, which represents an alternative to the EBF element or to the RSU element, which can be manufactured in problem-free manner and which offers an appropriate security against rotation and an appropriate axial press-out resistance.

A security against rotation of this kind is necessary so that on attachment of the functional element to a sheet metal part and the subsequent attachment of a nut on the bolt element, or the introduction of a bolt element to a nut element in order to secure a further component against the sheet metal part, not inconsiderable torques arise which could otherwise lead to loosening of the bolt element or of the nut element. Such torques also arise on releasing the corresponding threaded joint. Furthermore, an axial press-out resistance and also a button-out resistance are of importance because sheet metal parts which are provided with the respective functional elements are frequently transported as bulk material in a box from one factory to another, or within one factory. This can lead to loosening of the functional element in the individual sheet metal parts, which is disadvantageous for the later processing. Furthermore, on the attachment of a further component to the sheet metal part equipped with the functional element, automatic assembly tools for screws and nuts are frequently used which, on attachment of a nut to a bolt element or on screwing a bolt into a nut element, exert not inconsiderable axial forces on the respective functional element. Through this the danger of loosening of the functional element in the sheet metal part, or of failure of connection between the sheet metal part and the functional element exists when the press-out resistance and the button-out resistance are not guaranteed to the required degree.

In order to satisfy the above-named object, a functional element is provided in the form of a press-in element for attachment to a sheet metal part, with the functional element having a head part and a shaft part, with the head part having a ring-like sheet metal contact surface at the side adjacent the shaft part and a ring-like axial recess inside this ring-like sheet metal contact surface—which is referred to in the following as a ring recess—which surrounds the shaft part at the transition from the head part into the shaft part, with the functional element being characterized in that the shaft part has a plurality of circumferentially distributed radial recesses extending in the axial direction and between these noses which likewise extend axially and project radially. Raised material portions which form undercuts with the head part in the region of the ring-like recess are preferably formed at the shaft part. They can be arranged at the positions or in the region of the radial recesses, in particular at their axial ends adjacent to the head part. Furthermore, radially extending ribs providing security against rotation or other features providing security against rotation (such as for example discrete raised portions and/or recesses which are circular or square in plan view of alternating raised portions and recesses simply termed ribs providing security against rotation in the following for the sake of simplicity) are provided in the base region of the ring-like recess, preferably at positions, which are angularly offset in comparison to the positions of the radial recesses, for example in each case at the center between two sequential radial recesses. Basically however, any desired angle can be provided between the ribs providing security against rotation and the recesses in order to take account of the respective requirements. It is also possible to provide a different number of ribs providing security against rotation and recesses. It can also be conceivable in accordance with the invention to provide features providing security against rotation at the ring-like contact surface instead of or in addition to the features providing security against rotation in the base region of the ring recess. The ribs providing security against rotation can partly or fully cross or bridge the ring-like recess. It is however also conceivable to make the extent of the ribs providing security against rotation in the radial direction smaller than the width of the ring-like recess defined in the radial direction.

Through the above-described measures the sheet metal material can be brought into intimate contact with the radially projecting noses or with the base surfaces of the radial recesses and also with the radial ribs providing security against rotation which project axially into the ring recess, so that a security against rotation is achieved here and in particular at the preferably radially directed flanks of the noses and that the axial extending flanks of the ribs providing security against rotation. Moreover, the sheet metal material can be introduced into the undercuts which are formed by the raised material portions whereby a resistance against axial press-out is generated. Furthermore, the sheet metal material can contact the lateral boundaries of the raised material portions considered in the peripheral direction whereby an additional security against rotation is generated.

When the shaft part is formed as a thread the sheet metal material is furthermore, so deformed that the region of the sheet metal material remote from the head part of the functional element lies opposite to the axial end of the thread adjacent to the head part and radially inside the outer diameter of the thread.

Although the thread is manufactured by a thread rolling process after the manufacture of the radial recesses and the noses the enlargement of the shaft part which is associated with the thread rolling favors the previous manufacture of the radial recesses and noses since then the shaft part has a smaller diameter in the region of the thread which is to be produced which simplifies the production of the said recesses and noses by the axial displacement of material of the shaft part. If the situation is not present the radial recesses would have to be generated by a radial deformation of the shaft part would basically be possible.

The enlargement of the diameter in the region of the thread after its manufacture forms a thread run-out adjacent to the axial ends of the said recesses and noses remote from the head part which serves as an abutment for the sheet metal material and ensures the press-out resistance. If the said raised material portions and the corresponding undercuts are provided then the engagement of the sheet metal material into the undercuts increases the press-out resistance. If the thread run-out is not present or is not provided in a bolt element then the engagement of the sheet metal material into the undercuts itself forms the required form-fitted connection to generate the press-out resistance.

For a female element a corresponding region of increased diameter and serving as an abutment can be provided at the free end portion of the shaft part and ensure the press-out resistance in corresponding manner to the thread run-out as is provided for the bolt element. Should a shape of this kind not be present then the presence of the said undercuts and an engagement of the sheet metal material into these undercuts is necessary in order to generate the required form-fitted connection to produce the press-out resistance.

Even if a slight loosening of the functional element in the sheet metal material takes place an axial loss of the element is not straightforwardly possible because the sheet metal material would abut against the end of the thread. A security of this kind is also given with the formation as a nut element provided that a shaft part has an enlarged diameter at the side of the noses and/or of the axial recesses remote from the head part in the region of the noses, whereby the functional element cannot be pressed out of the sheet metal part. Such pressing out is avoided because the shoulder, which is formed at the transition the region having a larger diameter, will abut against the side of the sheet metal part remote from the head part of the nut element.

In both variants, i.e. as a male or female element an axial loss of the element in the other direction is not possible simply because the radial sheet metal contact surface of a head part contacts the sheet metal part and has a significantly larger diameter than the hole in the sheet metal part. Thus an axial loss is prevented in both axial directions.

Furthermore, the sheet metal material which is brought into contact during the attachment of a functional element axially within the ring-like recess and radially against the periphery having alternating projecting noses and radial recesses, whereby a particularly stable form results which is also resistant against button-out forces. The hole friction which arises there also increases the security against rotation and the press-out resistance.

Through the size of the head part or of the diameter of the sheet metal contact surface in combination with the form-fitted engagement with the sheet metal material and the axial press-out resistance an adequate button-out resistance of the elements is also ensured.

Through the deformation of the sheet metal material into the ring-like recess a close contact of the head part at the sheet metal part is also achieved, whereby deformations and distortions of the sheet metal part in the region of the head part of the element can be avoided. The ring groove furthermore, forms a receiving space for the material which arises through the generation of the radial grooves or recesses so that the corresponding raised material portions do not disturb the transition from the head part into the shaft part.

Furthermore, the attachment between the functional element and the sheet metal part in the region of the transition from a shaft part into the head part can be realized in such a way that a relatively small diameter of the shaft part and of the hole in the sheet metal part is present in this case, so that the later attachment of a further component to the side of the sheet metal part remote from the head part of the functional element can proceed without complications and the further component only needs to have a corresponding hole. This attachment of a further component of the sheet metal part can thus take place in such a way that the desired "direct clamping" is possible and indeed without having to work with load distributing washers.

Preferably from two to twelve radial recesses, preferably from four to eight radial recesses and in particular six radial recesses are provided with each radial projecting nose being provided between two adjacent radial recesses, i.e. the recesses in the noses are alternatingly arranged along the longitudinal axis of the functional element.

The undercuts are preferably located axially within the ring-like axial recess. At these positions the said raised material portions of the shaft part engage into a high quality secure engagement of the sheet metal material without causing distortions of the sheet metal material, particularly since the sheet metal material can escape during compression into the axial ring recess of the head part.

In accordance with the invention provision can be made in that at least one and in particular all of the radially extending ribs providing security against rotation have a free upper edge which at least regionally and in particular substantially fully lie in a plane which is defined by the ring-like sheet metal contact surface. The side of the ribs providing security against rotation which are exposed in a non-installed state of the functional element and which are in particular remote from the head part, i.e. from the base region of the ring-like recess are to be understood as the free upper edge.

As already explained above, at least one feature providing security against rotation or a section providing security against rotation can be arranged on the ring-like sheet metal contact surface, for example a rib or the like. This section providing security against rotation can be aligned in a radial direction with one of the ribs providing security against rotation and/or merge into these. For example, sections providing security against rotation present on the sheet metal contact surface and corresponding ribs providing security against rotation can be provided by continuous rib-like structures in particular linearly continuous rib-like structures in the radial direction which have a constant or variable extent in an axial direction.

In accordance with one embodiment at least one of the radially extending ribs providing security against rotation has an extent in the radial direction which is smaller than the width of the ring-like recess defined in the radial direction. In other words, at least one of the ribs providing security against rotation does not fully cross the ring-like recess but rather only partly. By way of example, the ribs providing security against rotation extend from the radially outer disposed margin of the ring-like recess inwardly in the radial direction and end before reaching the shaft part. The ring-like recess is thus not subdivided into segments which are completely separate from one another, but rather individual pocket-like sections are present which are connected to one another by a ring-like region which surrounds the shaft part. It will be understood that an inverse design is also conceivable in which the ribs providing security against rotation start from the shaft part and extend in the direction towards the outer edge of the ring-like recess, but which finish before they reach this. It is basically also possible for the ribs providing security against rotation (i.e. at least one of the ribs) to contact neither with the radially outer margin and the radially inner margin of the ring-like recess or to stand alternatingly in contact with the said margins.

The radially extending ribs providing security against rotation preferably have a maximum axial height which is smaller than the maximal axial depth of the ring-like recess, with the axial height of the ribs providing security against rotation preferably lying in a region amounting to between 25% and 90% and in particular in the region between 50% and 85% and especially at approximately 80% of the said depth.

The functional element is, in one variant, a bolt element having a thread at its shaft part, with the outer diameter of the thread having a radius which is larger than the (maximum) radial dimension from the longitudinal axis from the shaft part to the base surface of the radial recesses.

Furthermore, the outer diameter of the thread has a radius which is lager than the (maximum) radial dimension from the longitudinal axis of the shaft part to the radially outer surface of the radially projecting noses.

The base surface of the radial recesses and/or the outer surfaces of the noses preferably at least substantially lie on respective circular cylindrical surfaces or they form segments of such circular cylindrical surfaces. The base surfaces of the recesses then have a constant radial dimension as do also the outer surfaces of the noses. This is however not essential since other contours of the corresponding surfaces will be possible, whereby the said radial dimensions do not have to be constant but one can however speak of the maximum radial dimension.

Since the said maximum radial dimensions of the alternating noses and recesses are preferably smaller than the outer diameter of the thread it can be ensured that the sheet metal material lies radially inside the outer diameter of the thread and that the above-mentioned axial securing of the bolt element is ensured.

In this connection the raised material portions forming the undercuts can have a maximum radial dimension measured from the central longitudinal axis of the functional element which corresponds to the radial dimension of the thread and can be substantially or is indeed somewhat larger, whereby an improved security against rotation can be achieved.

The thread is preferably arranged at its end adjacent to the head part directly before the ends of the radial recesses or of the noses remote from the head part. In this way not only is the desired "abutment" for the sheet metal material formed at a favorable position, but rather the thread can also be manufactured without problems in a thread rolling process because the axial length of noses and the recesses signifies that the thread runs out before the head part. This facilitates the thread rolling process because this no longer has to be carried out right up to the head part as is the case with the EBF bolt.

When the press-in element is a hollow element whose hollow central passage is provided with a thread or can be provided with a thread then the shaft part can likewise be executed with a diameter at the side of the noses and recesses remote from the head part which is larger than the diameter of the shaft part in the region of the noses. This can, for example, be achieved by an axial compression process.

Furthermore, the free end of the shaft part can be formed to pierce the sheet metal part irrespective of whether the diameter is larger than the diameter of the shaft part in the region of the noses so that the nut element cuts its own hole in the sheet metal part in collaboration with a suitable die button on being inserted into the sheet metal part, i.e. the nut element is made self-piercing.

On the attachment of the functional element in accordance with the invention to a sheet metal part a component assembly arises having a special characterizing feature in that the sheet metal part extends within the radial recess around the radially extending ribs, into the axial recesses and into the undercuts and hereby ensures the required press-out resistance and the required security against rotation.

The component assembly is preferably so designed that the side of the sheet metal part remote from the head part is arranged adjacent to the bolt element directly before the end of the thread confronting the head part and for a hollow element directly before an end section of the hollow shaft part.

Particularly with relatively thin sheet metal parts of up to approximately 1 to 1.5 mm thickness the component assembly is so designed that the sheet metal part has a ring-like collar at the side remote from the head part with the radial inner surface of a collar lying closely against the noses or the base surfaces of the radial recesses. In this connection the ring collar can have an axial length below the lower side of the sheet metal part of, for example 1 to 3 mm, approximately corresponding to the length of the noses.

For thicker sheet metal parts starting from 1 or 1.5 mm thickness onwards the sheet metal part is so impressed by a nose or a ring nose of a die button that the sheet metal material extends at least substantially over the entire axial length of the noses. A great advantage of the functional element of the invention is that one element can be used, with the sheet metal parts of various thicknesses, for example from 0.6 to 4 mm, which makes the storage and costs for the user more favorable.

By the compression of the sheet metal material through the corresponding die button on attachment to the sheet metal part, the sheet metal material is caused to flow and lies as a result against the surface of the element between the raised material portions.

A method for the manufacture of the functional element in accordance with the invention in the form of a male element is characterized in that one starts from a cylindrical cold metal bar or wire and forms in a cold heading process a blank having a head part, having a shaft part and also having a ring-like axial recess which surrounds the shaft part at the side of the head part adjacent to the shaft part and which is at least partly crossed by radially extending ribs and preferably having a material collar around the shaft part in the region adjacent the head part; in that the material of the shaft part or (if provided) of the collar, is at least locally displaced by the cold heading process in order to form the radial recesses extending in the axial direction and the raised material portions forming undercuts at the ends of the radial recesses adjacent the head part and also noses arranged between the radial recesses, and in that subsequently either a thread is formed on the shaft part shortly before or directly before the axial ends of the radial recesses adjacent to the head part.

A method for the manufacture of a functional element in the form of a female element is characterized in that one starts from a cylindrical metal bar or wire and generates in a cold heading process a blank having a head part, having a shaft part and also a ring-like axial recess which surrounds the shaft part at the side of the head part adjacent to the shaft part and is at least partly crossed by radially extending ribs and preferably generates a material collar around the shaft part in the region adjacent to the head part; in that the material of the shaft part or (if provided) of the collar is displaced at positions during the cold heading process in order to form the radial recesses extending in the axial direction and the raised material portions forming the undercuts at the ends of the radial recesses adjacent to the head part as well as noses arranged between the radial recesses and in that an axially extending central passage is formed in the shaft part and in the head part.

In this connection the free end face of the nut element can be compressed in order to increase the radius of the free end from the longitudinal axis so that this radius is larger than the radius of the shaft part in the region of the radial recesses and preferably the radius of the shaft part in the region of the noses and in order to optionally form a piercing edge at the free end of the shaft part.

BRIEF DESCRIPTION OF THE FIGURES

The invention will be explained in the following in more detail with reference to the accompanying drawings in which are shown.

DETAILED DESCRIPTION OF THE INVENTION

Figure 1A:
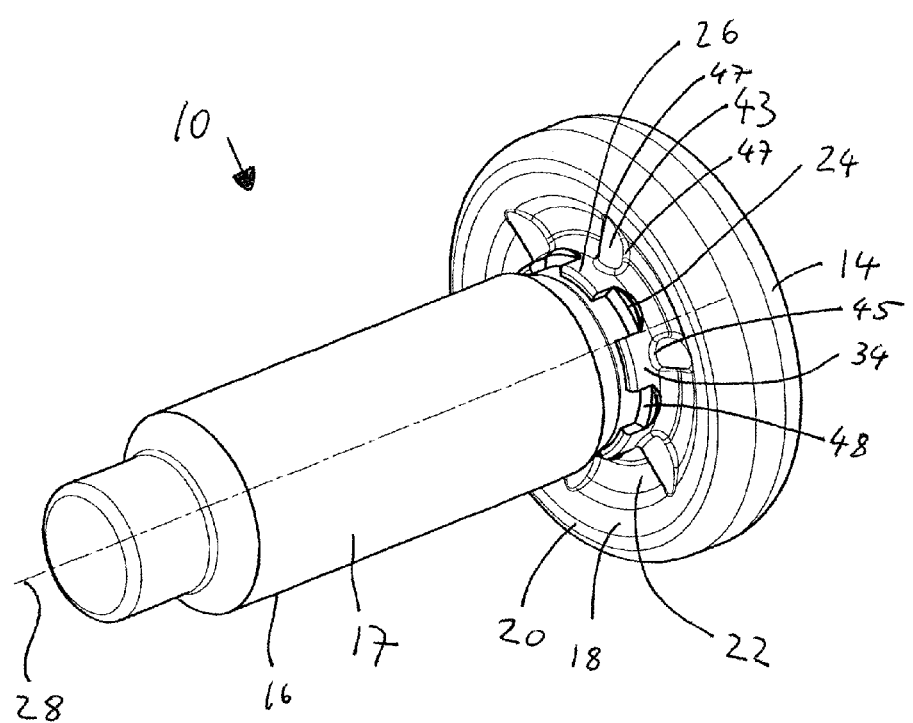
FIG. 1A a perspective representation of a functional element in accordance with the invention in the form of a bolt element, FIGS. 1B-1D illustrations of the bolt element of the invention of FIG. 1A in a side view partly sectioned in the longitudinal direction (FIG. 1B), and in larger representation of the circled region of FIG. 1B at the transition of the head part into the shaft part (FIG. 1C) and a front view onto the free end of the shaft part of the bolt element (FIG. 1D), FIGS. 2A-2C a series of drawings to represent the attachment of the bolt element in accordance with FIGS. 1A to 1D to a relatively thick sheet metal part, FIGS. 3A-3C a series of drawings to illustrate the attachment of the bolt element in accordance with FIGS. 1A to 1D to a relatively thin sheet metal part, FIGS. 4A-4D a series of drawings corresponding to the FIGS. 1A to 1D but for a functional element in accordance with the invention in the form of a nut element, FIGS. 5A-5C a series of drawings to illustrate the attachment of the nut element in accordance with FIGS. 4A to 4D to a relatively thick sheet metal part, FIGS. 6A-6C a series of drawings to represent the attachment of the nut element in accordance with FIGS. 4A to 4D to a relatively thin sheet metal part, FIG. 7A a perspective representation of a further embodiment of the functional element of the invention, FIGS. 7B-7D representations of the functional element of FIG. 7A in a side view partly sectioned in the longitudinal direction (FIG. 7B), an enlarged representation of the circled region of FIG. 7B at the transition of the head part into the shaft part (FIG. 7C) and an end view onto the free end of the shaft part of the functional element (FIG. 7D) in a first state during the manufacturing process, FIGS. 7E-7G analogous representations to that of FIGS. 7B to 7D with the functional element being shown in a second state during the manufacturing process, FIGS. 7H-7J analogous representations to FIGS. 7B to 7D and 7E to 7G with the functional element being shown in a third state, FIG. 8A a perspective illustration of a further embodiment of the functional element of the invention, FIGS. 8B-8D further representations of the embodiment of the functional element of the invention of FIG. 8A in views analogous to that of FIGS. 1B to 1D, FIG. 9A a perspective representation of a further embodiment of the functional element of the invention, and FIGS. 9B-9D representations of the embodiment of the functional element of the invention of FIG. 9A in views analogous to FIGS. 1B to 1D.

According to FIGS. 1A to 1D a functional element 10 is shown there in the form of a press-in element which is designed for attachment to the sheet metal part 12 or 12' in accordance with FIGS. 2A to 2C and 3A to 3C. The functional element 10 has a head part 14 and a shaft part 16. The head part 14 has at the side 18 adjacent to the shaft part 16 a ring-like sheet metal contact surface 20 and within this a ring-like axial recess 22 which surrounds the shaft part at the transition from the head part into the shaft part 16. Furthermore, the shaft part 16 has in this example six preferably distributed radial recesses 24 extending in the axial direction and between them likewise six axially extending and radially projecting noses 26 which alternate with the radial recesses around the central longitudinal axis 28 of the bolt element. At the positions of the radial recesses 24 raised material portions 30 are present at their axial ends adjacent to the head part which form undercuts 32 with the head part in the region of the ring-like axial recess 22.

The axially extending radial recesses are manufactured during manufacture of the element in the cylindrical region of a blank which has the same diameter as the radially outer side 34 of the noses 26.

One can see furthermore, that the outer diameter of the thread 17 has a radius which is larger than the (maximum) radial dimension from the longitudinal axis 28 of the shaft part 16 to the base surface 48 of the radial recesses 24. Furthermore, one can see that the outer diameter of the thread 17 has a radius which is larger than the maximum radial dimension from the longitudinal axis 28 of the shaft part 16 to the radially outer surface of the radially projecting noses 26.

The base surfaces 48 of the radial recesses 24 and/or the outer surfaces of the noses 26 lie in this example on respective circular cylindrical surfaces i.e. they form segments of such circular cylindrical surfaces. The bolt element thus has a cross-sectional shape in the region of the noses similar to that of a splined shaft. The base surfaces 48 of the recesses 24 thus have a constant radial dimension as have the outer surfaces of the noses 26.

The shaping of the axial ring recess 22 can in particular be seen in cross-section from the FIG. 1C. Thus radially extending ribs 43 providing security against rotation are provided which are arranged in the base region of the ring recess 22.

The ring recess 22—sometimes termed a ring groove—has a radially outwardly disposed oblique flank 36 which merges with a rounded transition 38 into the ring-like (annular) sheet metal contact surface 20. The base region 40 of the ring groove is likewise formed with a gentle rounded portion 42 and merges via a rounded surface (not shown, but having a shape corresponding to the radius 44 of the undercuts 32) into the shaft part 16 between the raised material portions 30. One can further see from FIG. 1C that the undercuts 30 are located axially within the ring groove 22.

The raised material portions 30 forming the undercuts 32 have a maximum radial dimension measured from the central longitudinal axis 28 of the functional element which corresponds at least substantially to the radial dimension of the thread 17 or may be somewhat larger, whereby a better security against rotation can be achieved.

In other respects the ring recess has an approximately rectangular cross-sectional shape with an obliquely positioned flank 36. The precise cross-sectional shape is not critical, however, as far as possible, sharp edges should be avoided.

The ribs 43 providing security against rotation are, as shown here, preferably arranged at positions which are angularly offset in comparison to the positions of the radial recesses around the central longitudinal axis of the functional element and which for example are arranged in each case at the center between two radial recesses. The illustrated positions of the ribs providing security against rotation in comparison to the radial recesses 24 is admittedly presently the position which appears most favorable, it is however not precluded that the ribs 43 providing security against rotation can be arranged not angularly offset by the half pitch relative to the radial recesses, but are arranged with a different position in the clockwise sense to the left or right of the illustrated central position and indeed particularly when they are made somewhat narrower than shown here. They should however not be aligned with the radial recesses 24 or partly overlap the positions of the radial recesses 24, since otherwise the undercuts which are arranged at the end of the radial recesses which are formed by the raised material portions 30 will be lost or will not be fully available.

As is likewise evident from the Figures, in particular from FIG. 1C the radial extending ribs 43 providing security against rotation have a maximum axial height h which is smaller than the maximum axial depth of the ring-like recess 22, with the axial height h of the ribs providing security against rotation preferably lying or amounting in the range between 25% and 90% and in particular in the range between 50% and 85% and especially by approximately 80% of the said depth t.

The ribs 43 providing security against rotation can have the shown preferred shape, i.e. with roots 45 which adjoin the noses 34 and run out with a rounded shape which—depending on the height h—lies in the region of the transition 38 or of the lateral flank or the inclined surface 36 of the ring recess 22, they can however also be narrower and excluded with lateral flanks 47 which extend more steeply than shown in the Figures. This applies fundamentally in analogous manner for all conceivable embodiments.

The preferred dimensions of the bolt element and also of the nut element 10' in accordance with FIGS. 4A to 4D can be taken from the drawings which are true to scale if one assumes that a basic measure for the scaling is the diameter of a thread, for example of an M6 or an M8 thread.

The transitions between the noses 26 and the radial recesses 24 are preferably formed as radial flanks 46, i.e. flanks which lie in radial planes with respect to the longitudinal axis 28. In this way the security against rotation can be ensured. Although six noses 26 and six radial recesses approximately having the same angular extent are preferred, a different number of noses 26 and radial recesses 24 and also different angular extents of these can also be selected. Too many noses and radial recesses, for example more than twelve of each, are normally unfavorable because it is difficult to form these and to simultaneously ensure a high security against rotation. A number of noses 26 and of the radial recesses of less than three or four also makes it difficult to achieve the desired security against rotation.

Figure 2A:
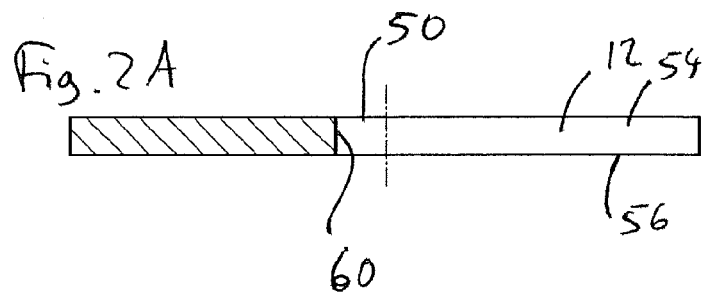
Figure 2B:
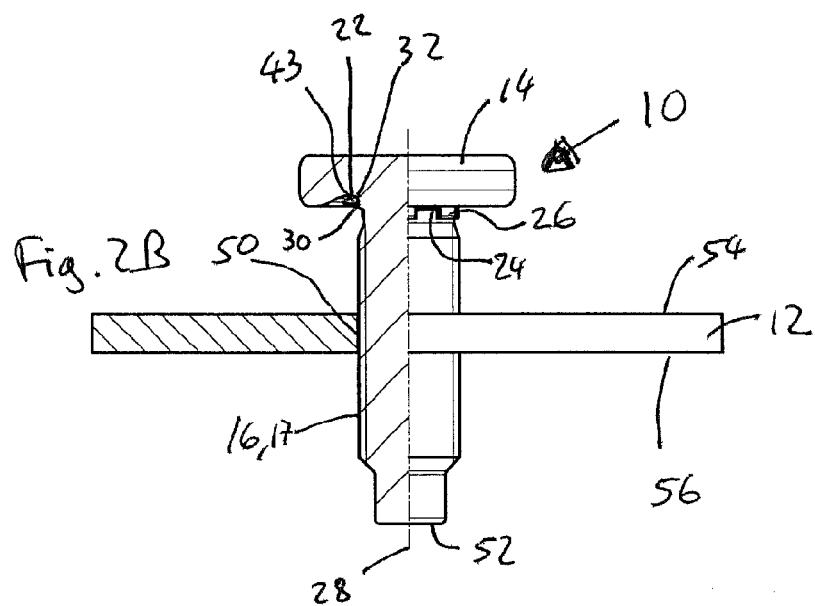
Figure 2C:
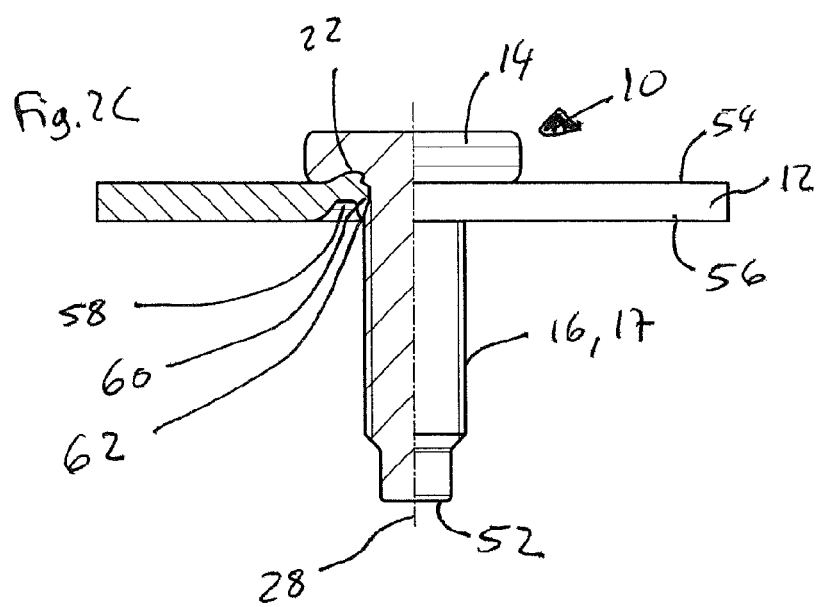
Figure 4A:
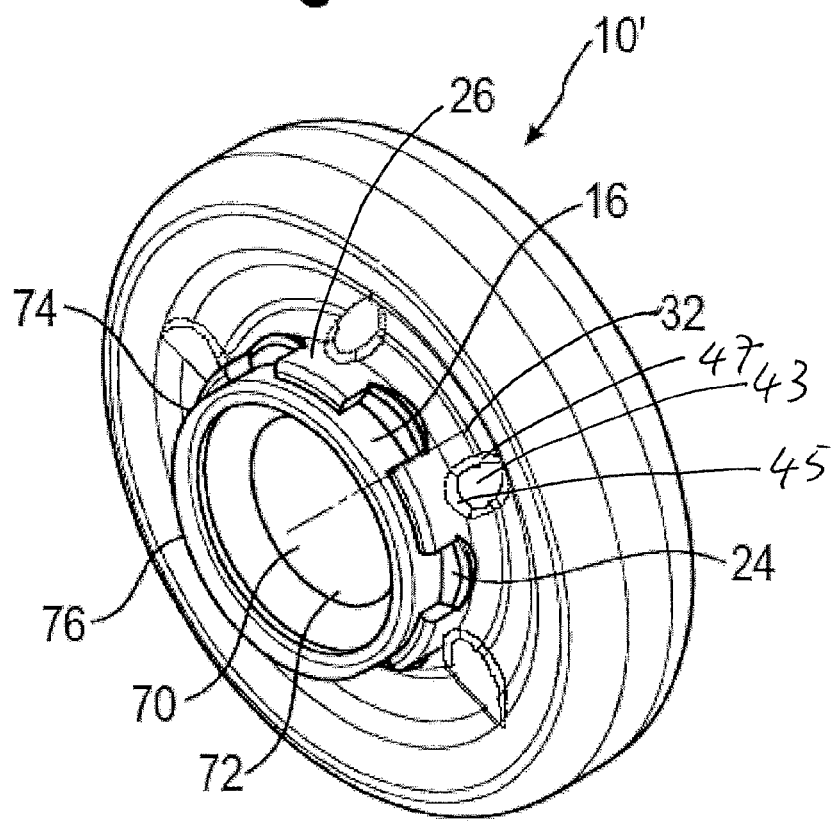
Figure 4D:
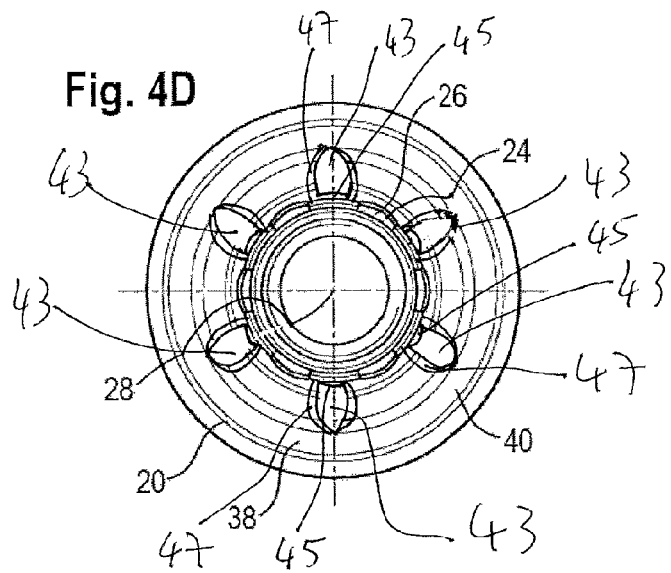
Figure 4B:
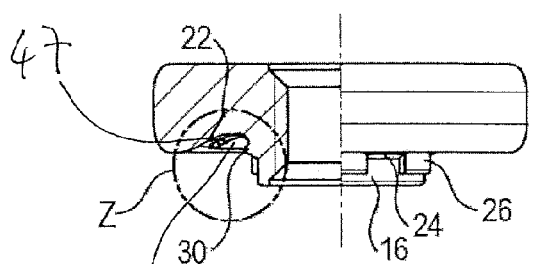
Figure 4C:
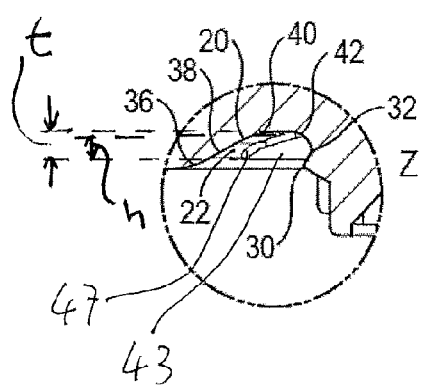
Figure 6A:
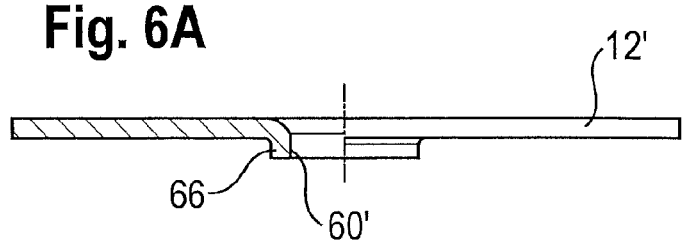
Figure 6B:
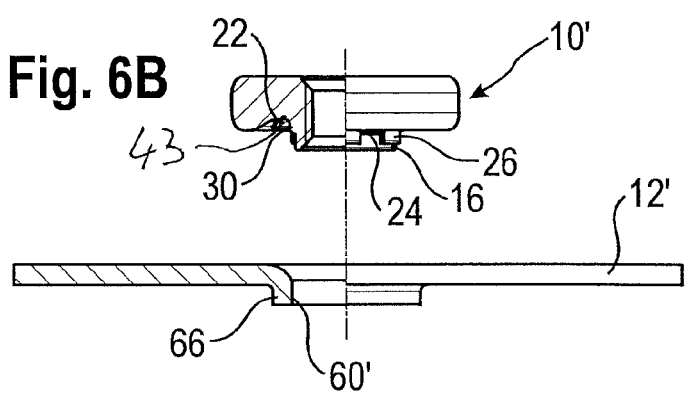
Figure 6C:
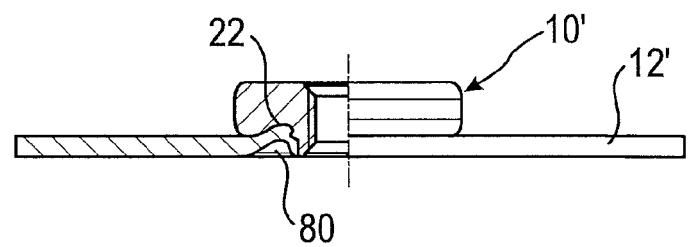

The FIGS. 2A to 2C now show the attachment of the bolt element of FIGS. 1A to 1D to a sheet metal part 12 which is here provided as a relatively thick sheet metal part with a thickness of 3 mm for an M8 thread. During attachment of the bolt element which can take place in a press or in a C-frame or by a robot in a manner known per se the pre-pierced (smoothly pierced) sheet metal part 12 (FIG. 2A) has a hole or a pierced aperture 50 having a cylindrical shape having a diameter corresponding to that of the thread, i.e. in this example 8 mm.

The shaft part 16 of the bolt element 10 which is held in the region of the head part by a corresponding tool or setting head (not shown) is guided with the free end face 52 on the shaft part 16 to the fore through the hole 50 (FIG. 2B). Thereafter, for example in a further closing movement of the press, the head part 14 is pressed against the upper side 54 of the sheet metal part 12, while the latter is supported at the lower side 56 on a die button (not shown). In this connection the die button has a central opening which receives the shaft part 16 of the bolt element and a ring nose which projects from its planar end face and has a shape complementary to that of the pressed-in ring recess 58 in the lower side of the sheet metal part 12. Through the pressing in of the ring recess 58 the sheet metal material in the marginal region 60 of the hole 50 is displaced radially inwardly into the radial recesses 24 into contact against the base surfaces 48 of these recesses and also against the outer side 34 of the noses 26 and against the flanks of the noses 26 and is furthermore, displaced axially upwardly into the axial ring recess 22 via the raised material portions 20 and also into the undercuts 32. Furthermore, the sheet metal material is formed around the ribs 43 providing security against rotation so that it contacts all surfaces of the ribs 43 providing security against rotation, in particular also against the lateral flanks 47 of the ribs 43 providing security against rotation, which is favorable for the security against rotation. In other words, an impression of the ribs providing security against rotation is formed in the reshaped sheet metal part. The ribs 43 providing security against rotation also serve for a different task. Through the displacement of the sheet metal material in the region of the ribs 43 providing security against rotation the sheet metal material is caused to flow better in such a way that it better or completely fills out the undercuts 32 which favors the press-out resistance.

The finished component assembly is designed as shown in FIG. 2C and it can be seen that the lower side of the sheet metal part 12 in the region of the margin 60 of the hole contacts the thread run-out 62. In this way and through the engagement of the sheet metal material into the undercuts 32 a situation is prevented in which the bolt element 10 can be pressed upwardly out of the sheet metal part 12.

Furthermore, it should be pointed out that the contact of the sheet metal material at the thread run-out is also possible for thinner sheet metals, when the corresponding die button is designed in order to so shape the sheet metal material in the region of the hole margin 60' that an adequate extension of the sheet metal material into this reshaped region takes place. The radially inwardly and axially upwardly directed movement of the sheet metal material is brought about particularly expediently by the inclined flanks of the ring nose of the die button and mirrored in the obliquely set sides 64 and 66 of the ring recess 58.

The attachment of the same bolt element 10 into a relatively thin sheet metal part is shown in FIGS. 3A to 3C. As can be seen in FIG. 3A the pierced hole is there provided with a downwardly projecting ring collar 66 which can take place through a sheet metal preparation known per se in an EBF bolt.

The representation in accordance with FIG. 3B corresponds to that of FIG. 2B, apart from the thinner sheet metal part and the presence of the ring collar 66 and does therefore not need to be especially described. Instead of this the previous description also applies to this Figure. In any event in the concept that the same reference numerals are used for common features or features having the same function always applies for the entire description of the drawings unless something is stated to the contrary. It is evident from FIG. 3C that the impression of the sheet metal part by the ring nose of the die button also leads, with a thin sheet metal part, to the sheet metal material being brought fully into engagement with the shaft part 16 of the bolt element in the region of noses 26 and the radial recesses 24. In this connection the not shown die button here also has a central opening which receives the shaft part 16 of the bolt element and has a ring nose projecting from its planar end face to the shape complementary to that of the pressed-in ring recess 58 in the lower side of the sheet metal part, except that in this case the die button has a ring nose with an asymmetrical shape in order to take account of the shape of the ring collar and indeed in such a way that the oblique side 64 of the ring recess 58 is longer than the oblique side 66. Through the pressing in of the ring recess 58 the sheet metal material is here also pressed radially inwardly in the rim region 60 of the hole 50 above all in the region of the ring collar 68 radially into the radial recesses 24 into contact with the base surface 48 of these recesses and also at the outer sides 34 of the noses 26 and is brought into contact with the flanks of noses 26. Furthermore, the sheet metal material is urged axially upwardly into the axial radial recess 22 around the raised material portions 30 and also into the undercuts 32.

The finished component assembly is designed as shown in FIG. 3C and it can also be seen here that the lower side of the sheet metal part 12 in the region of the hole margin 60 of the ring collar which is slightly reshaped by the nose of the die button against the thread run-out 62 and stands directly above the latter. In this way and through the engagement of the sheet metal material into the undercuts 32 a situation is prevented in which the bolt element 10 can be pressed upwardly out of the sheet metal part 12.

Furthermore, it should be pointed out that the contact of the sheet metal material at or directly in front of the thread run-out is also possible with even thinner sheet metals when the corresponding die button is designed in order to so reshape the sheet metal material in the region of the hole margin 60' or of the ring collar 68 that an adequate extension of the sheet metal material in height into this reshaped region takes place. The radially inwardly and outwardly directed movement of the sheet metal material is particularly expediently brought about by inclined flanks of the ring nose of the die button which are mirrored in the obliquely sides 64 and 66 of the ring recess 58. Thus, for the formation of the shaft part 16 with a thread 17, the sheet metal material is so deformed—irrespective of whether the sheet metal material is in the form of a thinner sheet metal part or of a thicker sheet metal part—with a unitary bolt element only by means of slightly different die buttons matched to the respective sheet metal part thickness in such a way that the sheet metal material is brought into contact at the element in the desired manner and thus described above. Specifically, the reshaping of the sheet metal part takes place in such a way that the region 60' of the sheet metal material remote from the head part 14 of the functional element lies opposite to the axial end of the thread 17 adjacent to the head part and radially within the outer diameter of the thread 17. In this way, even with slight loosening of the functional element in the sheet metal part, an axial loss of the element is prevented, because the sheet metal material abuts or will abut against the end of the thread.

An example for a female, i.e. hollow press-in element is shown in FIGS. 4A to 4D. In the drawings in accordance with FIGS. 4A to 4D and also 5A to 5C and 6A to 6C the same reference numerals are used as for the previous Figures and the previous description also applies in the same sense for these Figures which is why only the important differences will be discussed here.

The nut element 10' has a hollow central passage 70 which is provided with an internal thread 72. The shaft part 16 is provided here with a diameter in the region of the cylindrical section 74 of its free end which corresponds to the diameter of the shaft part in the region of the base surface 48 of the radial recesses 24. The end face 76 of the element is provided with a small radius, can however also be provided with a sharp edge at this position. The element can be introduced in a self-piercing manner into the sheet metal part. Instead of the illustrated design the shaft part can also be executed with a diameter at the side of the noses and recesses remote from the head part, i.e. in the region 74, which is larger than the diameter of the shaft part 16 in the region of the noses 26. This, as also a to some degree sharp piercing edge can, for example, be achieved by an axial compression process at the shaft part after formation of the noses 26 and the radial recesses 24.

The free end 76 of the shaft part 16 can thus, irrespective of whether the diameter is larger than the diameter of the shaft part 16 in the region of the noses 26 or not, be formed to pierce the sheet metal part, so that the nut element 10' cuts its own hole in the sheet metal part on insertion of the sheet metal part together with a suitable die button. I.e. the nut element 10' is made self-piercing.

During the attachment of the functional element 10 of the invention as shown in FIGS. 4A to 4D to a sheet metal part 12 or 12' in accordance with FIGS. 5A to 5C and 6A to 6C a component assembly arises with the special characterizing feature that the sheet metal part extends within the ring recess 22 into the radial recesses 24 and into the undercuts 32 and hereby ensures the required press-out resistance and the required security against rotation.

When the element is designed in such a way that the section 74 is larger in diameter than the shaft part 16 in the region of the noses, the end face 76 of the element lies within a recess 80 of the sheet metal part axially in front of the side of the sheet metal part remote from the head part in the region outside of the recess 80. The precise design of the recess 80 is realized by a complementary shape of the ring nose of the die button (not shown). In this manner a planar screw-on surface 82 for a component to be screwed on (not shown) is present which corresponds to the lower side of the sheet metal part 12, 12'. One notes that with the thin sheet metal parts 12' the axial depth of the ring recess 22 is exploited in order to provide an adequate constructional height for the attachment to the sheet metal part 12'.

If an enlarged diameter of the shaft part 16 is provided in the section 74 then an additional axial press-out resistance is achieved because a shoulder is formed there, similar to or corresponding to the thread run-out in a bolt element. In this way, with a female element, the attachment of the sheet metal part to the element is achieved in a similar way as for a bolt element.

A method for the manufacture of the functional element in accordance with the invention in the form of a male element is characterized in that one starts from a cylindrical metal bar or wire and manufactures a blank in a cold heading process having a head part, having a shaft part and also having a ring-like axial recess in the head part which surrounds the shaft part ad the side of the head part adjacent to the shaft part and should at least partly crossed by radially extending ribs 43.

A material collar is preferably generated around the shaft part in the region adjacent to the head part, and indeed preferably with a diameter which corresponds to that of the noses 26 in the finished element. This material collar is displaced at positions by the cold heading process by further cold heading of the material of the shaft part in order to form radial recesses 24 extending in the axial direction and raised material portions 30 forming the undercuts 32 at the ends of the radial recesses 24 adjacent the head part 14 as well as the noses 26 which remain between the radial recesses. Thereafter the thread 17 is formed by a rolling process on the shaft part shortly before or directly before the axial ends of the radial recesses remote from the head part. In this way the diameter of the shaft part grows so that the outer diameter of the thread is larger than that of the noses 26.

A method for the manufacture of a functional element in the form of a female element is characterized in that one starts from a cylindrical metal bar or wire and manufactures in a cold heading process a blank having a head part, having a shaft part and also having a ring-like or annular axial recess in the head part which surrounds the shaft part at the side adjacent to the shaft part and which is partly crossed by radially extending ribs 43. Here the element is preferably also produced with a material collar around the shaft part in the region adjacent to the head part. Through the cold heading process, also a further cold heading step, the material of the shaft part or (if provided) of the collar is displaced locally in order to form the radial recesses extending in the axial direction and the raised material portions forming the undercuts at the ends of the radial recesses adjacent to the head part as well as the noses arranged between the radial recesses. Furthermore, an axially extending central passage is formed in the shaft part and in the head part. This can already take place at the start of the cold heading process during formation of the shaft part.

In all embodiments all materials can be considered as an example for the material of the functional element which in the context of cold deformation (cold heading) achieve the strength values of class 8 in accordance with the ISO standard or higher, for example, a 35B2 alloy in accordance with DIN 1654. The so-called fastener elements are suitable amongst other things for all steel materials customary in commerce for deep-drawn sheet metal parts and also for aluminum or those alloys. Also aluminum alloys, in particular those of higher strength can be used for the functional elements, for example AlMg5. Also functional elements of higher strength magnesium alloys such as, for example AM50, can also be considered.

In FIG. 7A an embodiment of the functional element 10 is shown which in many aspects is the same as the embodiment shown in FIG. 1 which is why the same reference numerals will be used. It is however evident that differences exist, in particular in the design of the sheet metal contact surface 20 of the ring recess 22. The ribs 43 providing security against rotation are also designed differently from the embodiment shown in FIG. 1A.

The sheet metal contact surface 20 of the functional element 10 of FIG. 7A forms a comparatively narrower ring. Moreover, the axial ring recess 22 is made broader and has a substantially planar base region 40. The ribs 43 providing security against rotation extend, starting from the radially outer edge of the ring recess 22—ultimately the lateral flank 36—in the radial direction towards the inside. However, they do not fully cross the ring recess 22 so that they are not in contact with the shaft part 16. The ring recess 22 is not interrupted in peripheral direction adjacent to the recesses 24, the noses 26 and the raised material portions 30 at the end of the shaft part 16 adjacent the head part 14 which in many cases leads to an improvement of the fixation of the bolt element 10 in a sheet metal part, without the reliability of the security against rotation being impaired.

A respective free upper edge O of the ribs 43 providing security against rotation lies in a plane defined by the sheet metal contact surface 20. Instead of the comparatively steep radially inner drop-off of the ribs 43 providing security against rotation provision can also be made for these two run-out gradually to the base region 40, for example with a linear or curved extent.

FIG. 7B shows a side view partly sectioned in the longitudinal direction of the bolt element shown in FIG. 7A in an intermediate state of the manufacturing process of the bolt element 10. In a transition region from the shaft part 16 to the head part 14 a material collar 90 can be recognized from which—as will be explained in more detail later—the recesses 24 and the raised material portions 30 are produced. Moreover, the shaft part 16 has not yet been provided with the thread 17.

FIG. 7C shows this region in enlarged form, whereby the comparatively steep drop-off of the ribs 43 providing security against rotation can be recognized at their radially inner ends. Moreover, the lateral flank 36 of the ring recess 22 is steeper than in the above described embodiments and has a linear extent. The base region 40 is essentially planar.

FIG. 7E shows the bolt element 10 after a further step of the manufacturing process. By cold heading the material of the material collar 90 is displaced section-wise in the axial direction so that the recesses 24 and the raised material portions 30 which can be recognized more clearly in FIG. 7F arise which make available the undercuts 32 which are at the fixation of the bolt element 10 to a sheet metal part acting in the axial direction. The recesses 24 and the raised material portions 30 associated therewith can also be well recognized in the axial view of the bolt element 10 of FIG. 7G. In this connection it is once again pointed out that it is not essential for the ribs 43 providing security against rotation to be aligned in a peripheral direction opposite to the noses 26. Basically any desired angular position of the said elements 43, 26 is possible. Moreover, provision can be made for a different number of ribs 43 providing security against rotation and noses 26 to be provided. In deviation from the symmetrical design and distribution of the elements 24, 26, 30, 43 an asymmetrical design and/or distribution can also be selected. By way of example recesses 24, noses 26, raised material portions 30 and/or ribs 43 providing security against rotation of differently designed width can also be provided. The same is true in an analogue manner for all embodiments of the functional element in accordance with the invention.

FIG. 7H shows the bolt element 10 in an essentially finished state after the conclusion of the manufacturing process. The shaft part 16 is provided here locally with a thread 17 whereby this section extends further in the radial direction. This leads to a situation in which the noses 26 and recesses 24 which could still be readily recognized in FIG. 7G are covered in FIG. 7J. Only the raised material portions 30 can still be recognized.

Figure 8A:
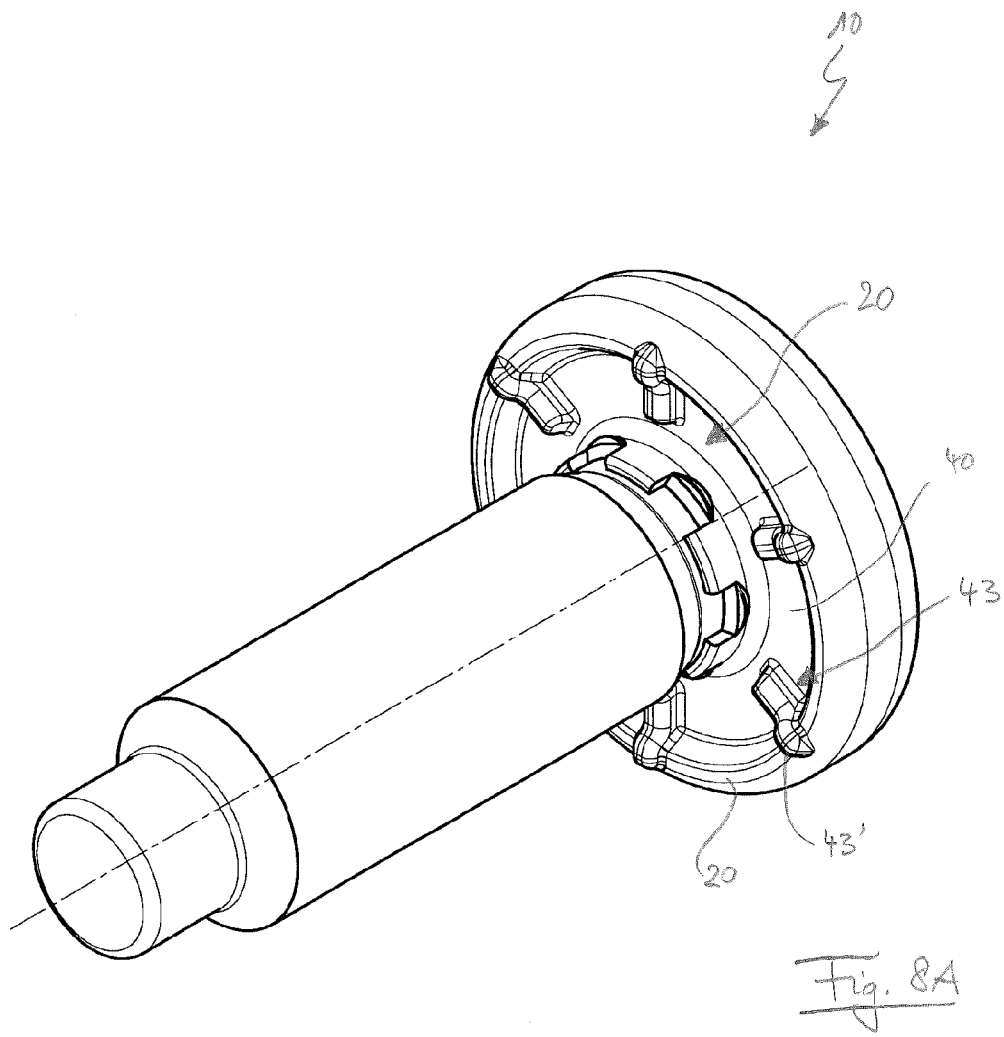

FIG. 8A shows a further embodiment of the bolt element 10 which largely resembles that of FIG. 7A. However, the ribs 43 providing security against rotation only partly extend onto the sheet metal contact surface 20 and beyond. In other words in each case a section 43' of the ribs 43 providing security against rotation extends over the sheet metal contact surface 20 and projects from it in the axial direction. It can be seen that the extent of the sections 43' providing security against rotation is somewhat smaller in the axial direction, starting from the sheet metal contact surface 20 than the ribs 43 providing security against rotation from the base region 40 of the ring recess 22. It is however also conceivable to make the axial extent of the sections 43' providing security against rotation or of some of them of the same size or larger. The upper edge O of the ribs 43 providing security against rotation thus lies at least in the region of the sections 43' providing security against rotation not in the plane of the sheet metal contact surface 20, whereas this is the case for the segments of the ribs 43 providing security against rotation lying in the region of the ring recess 22. The course of the upper edge O between the sections 43' providing security against rotation and the said segments is rounded in order to avoid sharp edges.

The FIGS. 8B to 8D show the bolt element 10 of FIG. 8A in an analogue manner like the FIGS. 1B to 1D show the bolt element 10 of FIG. 1A in order to make clear the extent of the ribs 43 providing security against rotation which engage over the sheet metal contact surface 20. In FIG. 8D in particular the ring region of the ring recess 22 around the shaft part 16 which is not interrupted by the ribs 43 can be particularly recognized.

Figure 9A:
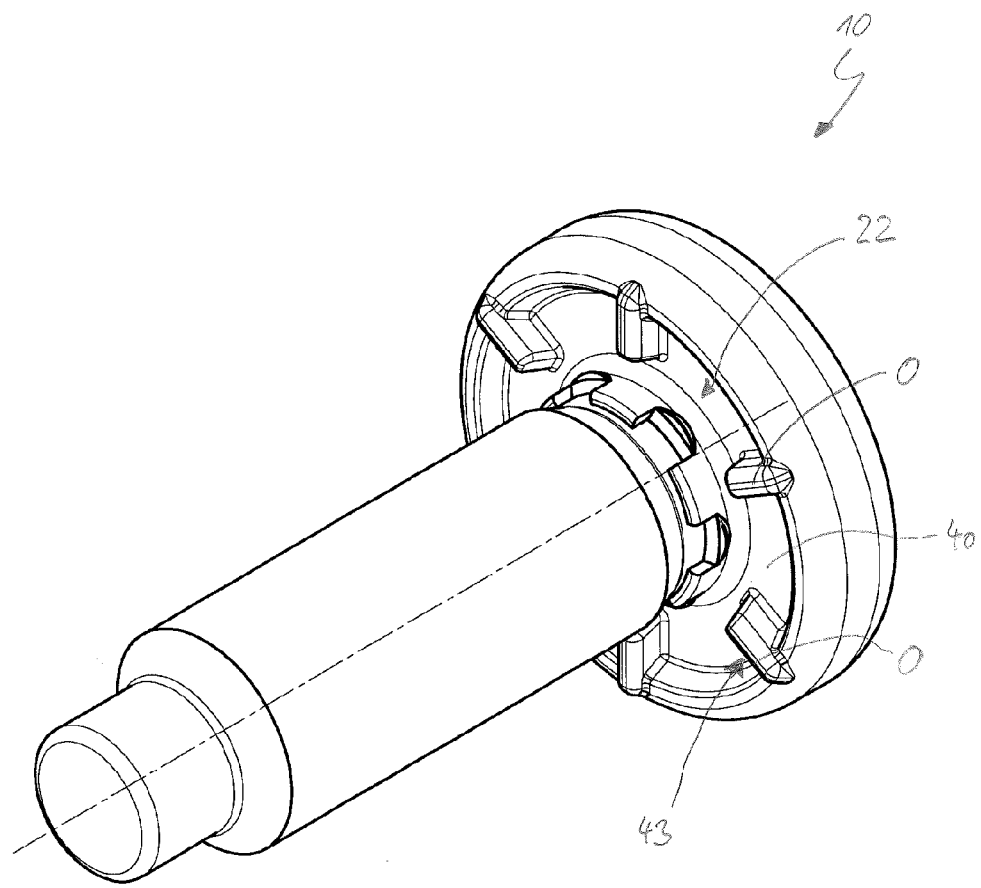

FIG. 9A shows a further embodiment of the bolt element 10. The ribs 43 providing security against rotation indeed have a course which engages over the sheet metal contact surface 20 in the radial direction as in the embodiment shown in FIG. 8A. However, the respective upper edges O of the ribs 43 providing security against rotation is arranged up to a central region of the sheet metal contact surface 20 in the radial direction in a plane which is offset parallel to the plane spanned by the sheet metal contact surface 20. Starting from this region the ribs 43 providing security against rotation extend in radial direction outwardly. It will be understood that the outwardly extending course of the ribs 43 providing security against rotation can be matched in desired manner into the respectively present requirements. The same applies for the radially inner drop-off of the ribs 43 providing security against rotation from the upper edge O to the base region 40. This fall off defines the radially outer margin of the ring region of the ring recess 22 around the shaft part 16 which is not interrupted by the ribs 43.

The FIGS. 9B to 9D additionally show further views of the bolt element 10 shown in FIG. 9A.

In distinction to the ratios shown in FIGS. 7A to 9D the radial extent of the ribs 43 providing security against rotation towards the shaft part 16 can be freely selected. In other words the width of the ring region of the recess 22 around the shaft part 16 which is not interrupted by the ribs 43 providing security against rotation can be freely selected in order to provide the bolt element 10 with the desired properties. Basically it is also possible to allow the ribs 43 providing security against rotation to extend outwardly starting from the shaft part 16 in the radial direction—or also oblique—and to provide a ring region which is not interrupted by the ribs 43 providing security against rotation and which is arranged between the radially outer ends of the ribs 43 providing security against rotation and the radially outwardly disposed oblique flank 36 of the recess 22. It is also conceivable to connect the ribs 43 providing security against rotation neither with the shaft part 16 nor with the flank 36 so that two interruption-free ring regions of the recess 22, in particular coaxial regions, are formed.

It should additionally be noted that not all ribs 43 providing security against rotation necessarily have to have the same design—i.e. for example the same axial, radial extent and/or width and/or design of flanks of the ribs 43. In specific cases it can be advantageous to make the ribs 43 providing security against rotation of different length, width and/or height and/or to connect these with the shaft part 16 or the flank 36 in particular alternatingly. In this connection embodiments are conceivable in which none of the ribs 43 providing security against rotation completely cross the recess 22 in the radial direction in which nevertheless no uninterrupted ring region is present.

A combination of the above described different embodiments of the ribs 43 providing security against rotation at a bolt element 10 is likewise possible.

Simply for the sake of completeness it should be pointed out that the above embodiments for different designs of the bolt element 10 apply in analogous form to a corresponding nut element.

REFERENCE NUMERAL LIST 10, 10' bolt element, nut element
12, 12' sheet metal part
14 head part
16 shaft part
17 thread
18 underside of the head part
20 sheet metal contact surface
22 axial recess
24 radial recess
26 noses
28 central longitudinal axis
30 raised material portion
32 undercuts
34 radially outer side of the noses
36 lateral flank
38 transition
40 base region of the ring groove
42 rounded portion
43 ribs providing security against rotation
43' section providing security against rotation
44 radius
45 root of the ribs providing security against rotation of the shaft part 16 or at the noses 26
46 radial surface
47 lateral flanks of the ribs 43 providing security against rotation
48 base surface
50 pierced hole
52 end face
54 upper side of the sheet metal part
56 lower side of the sheet metal part
58 ring recess in the sheet metal part
58' ring recess in the sheet metal part
60 marginal region of the pierced hole
60' reshaped marginal region of the pierced hole
62 thread run-out
64 side of the ring recess 58
66 side of the ring recess 58
68 ring collar
70 central passage
72 internal thread 74 cylindrical section
76 end face of the nut element
80 recess of the sheet metal part
82 planar screw-on surface
90 material collar
O upper edge

The invention claimed is:

1. A functional element in the form of a press-in element for attachment to a sheet metal part (12; 12'), wherein the functional element has a head part (14) and a shaft part (16), the head part having a sheet metal contact surface in the shape of a ring (20) at the side (18) adjacent to the shaft part and, within this sheet metal contact surface in the shape of a ring, an axial recess in the shape of a ring (22) which surrounds the shaft part (16) at the transition of the head part (14) into the shaft part (16), wherein the shaft part (16) has a plurality of peripherally distributed radial recesses (24) extending in the axial direction and between them likewise axially extending and radially projecting noses (26), wherein raised material portions (30) are provided which form undercuts (32) with the head part in the region of the recess in the shape of a ring (22) and with radially extending ribs (13) providing security against rotation or other features providing security against rotation being provided in the base region of the recess in the shape of a ring (22).

2. The functional element in accordance with claim 1, wherein the undercuts are present at the positions of the radial recesses (24) at their axial ends adjacent to the head part.

3. The functional element in accordance with claim 1, wherein the ribs (43) providing security against rotation or the features providing security against rotation are arranged at positions which are angularly offset around the central longitudinal axis (28) of the functional element in comparison to the positions of the radial recesses (24).

4. The functional element in accordance with claim 3, wherein the ribs (43) providing security against rotation or the features providing security against rotation are each arranged at the center between two sequential radial recesses (24).

5. The functional element in accordance with claim 1, wherein the undercuts (32) are located axially within the axial recess in the shape of a ring (22).

6. The functional element in accordance with claim 1, wherein at least one of the radially extending ribs (43) providing security against rotation has a free upper edge (0) which lies at least partly in a plane which is defined by the sheet metal contact surface in the shape of a ring (20).

7. The functional element in accordance with claim 1, wherein at least one of the radially extending ribs (43) providing security against rotation has a free upper edge (0) which lies substantially completely in a plane which is defined by the sheet metal contact surface in the shape of a ring (20).

8. The functional element in accordance with claim 1, wherein at least one section (43') providing security against rotation is arranged on the sheet metal contact surface in the shape of a ring (20) and/or merges into one of the ribs (43) providing security against rotation.

9. The functional element in accordance with claim 8, wherein the at least one section (43') providing security against rotation and arranged on the sheet metal contact surface in the shape of a ring (20) is aligned in the radial direction with one of the ribs (43) providing security against rotation.

10. The functional element in accordance claim 1, wherein at least one of the radially extending ribs (43) providing security against rotation has an extent in the radial direction which is smaller than the width (B) of the recess in the shape of a ring (22) defined in the radial direction.

11. The functional element in accordance with claim 1, wherein it is a bolt element (10) having a thread (17) at its shaft part (16), with the outer diameter of the thread (17) having a radius which is larger than the (maximum) radial dimension from the longitudinal axis (28) of the shaft part (26) to the base surface of the radial recesses (24) or to the radially outer surface of the radially projecting noses (26).

12. The functional element in accordance with claim 11, wherein the raised material portions (30) forming the undercuts (32) have a maximum radial dimension measured from the central longitudinal axis (28) of the functional element which at least substantially corresponds to the radial dimension of the thread (17).

13. The functional element in accordance with claim 11, wherein the thread (17) is arranged at its end adjacent to the head part (14) directly in front of the ends of the radial recesses (24) or of the noses (26) remote from the head part (14).

14. The functional element in accordance with claim 1, wherein the functional element is a hollow element (10') having a central hollow passage (70) which is provided with a thread (72) or can be provided with a thread.

15. A component assembly comprising a functional element (10; 10') in combination with a sheet metal part (12; 12'), wherein the functional element is in the form of a press-in element for attachment to a sheet metal part (12; 12'), wherein the functional element has a head part (14) and a shaft part (16), the head part having a sheet metal contact surface in the shape of a ring (20) at the side (18) adjacent to the shaft part and, within this sheet metal contact surface in the shape of a ring, a axial recess in the shape of a ring (22) which surrounds the shaft part (16) at the transition of the head part (14) into the shaft part (16), wherein the shaft part (16) has a plurality of peripherally distributed radial recesses (24) extending in the axial direction and between them likewise axially extending and radially projecting noses (26), wherein raised material portions (30) are provided which form undercuts (32) with the head part in the region of the recess in the shape of a ring (22) and with radially extending ribs (13) providing security against rotation or other features providing security against rotation being provided in the base region of the recess in the shape of a ring (22)

wherein the sheet metal part (12; 12') is arranged such that it extends into the recess in the shape of a ring (22) around the radially extending ribs (43) and extends into the undercuts (32) and hereby ensures the press-out resistance required and/or the security against rotation required.

16. The component assembly in accordance with claim 15, wherein the sheet metal material contacts the surface of the element (10; 10') between the raised material portions (30).

17. The component assembly in accordance with claim 15, wherein the side of the sheet metal part (12; 12') remote from the head part (14) is arranged in the region adjacent to the shaft part (16) in a bolt element directly in front of the end of the thread (17) adjacent the head part (14) and, in a hollow element (10') in front of the free end face (76) of the hollow shaft part.

18. The component assembly in accordance with claim 15, wherein the sheet metal part (12; 12') has a ring collar (68) at the side remote from the head part with the radial inner surface of the ring collar lying closely in contact with at least one of the noses (26) and the base regions of the radial recesses (24).

19. The component assembly in accordance with claim 18, wherein the axial end of the ring collar (68) arranged adjacent to the shaft part (16) remote from the head part (14) is arranged in a bolt element (10) directly before the end of the thread (17) adjacent to the head part (14) and, for a hollow element, directly before the free end face (76) of the hollow shaft part.

* * * * *